United States Patent
Takemoto et al.

(10) Patent No.: US 9,476,620 B2
(45) Date of Patent: Oct. 25, 2016

(54) COGENERATION SYSTEM

(75) Inventors: Toru Takemoto, Osaka (JP); Ryoichi Hagiwara, Osaka (JP); Takahiro Kyakuno, Osaka (JP); Megumi Suzuki, Osaka (JP)

(73) Assignee: YANMAR CO., LTD., Osaka (JP)

(*) Notice: Subject to any disclaimer, the term of this patent is extended or adjusted under 35 U.S.C. 154(b) by 613 days.

(21) Appl. No.: 13/981,255

(22) PCT Filed: Jan. 20, 2012

(86) PCT No.: PCT/JP2012/051181
§ 371 (c)(1),
(2), (4) Date: Oct. 2, 2013

(87) PCT Pub. No.: WO2012/102197
PCT Pub. Date: Aug. 2, 2012

(65) Prior Publication Data
US 2014/0013785 A1  Jan. 16, 2014

(30) Foreign Application Priority Data

Jan. 24, 2011 (JP) ................................ 2011-012157

(51) Int. Cl.
*F25B 30/00* (2006.01)
*F25B 30/02* (2006.01)
(Continued)

(52) U.S. Cl.
CPC .............. *F25B 30/02* (2013.01); *F01K 13/02* (2013.01); *F02G 5/04* (2013.01); *F25B 15/00* (2013.01); *F25B 25/02* (2013.01); *F25B 27/02* (2013.01); *Y02B 30/52* (2013.01); *Y02E 20/14* (2013.01); *Y02T 10/166* (2013.01)

(58) Field of Classification Search
None
See application file for complete search history.

(56) References Cited

U.S. PATENT DOCUMENTS 4,380,909 A * 4/1983 Sung .......................... F02G 5/00
                                                    62/101
4,802,100 A * 1/1989 Aasen ........................ F02G 5/04
                                                    290/4 R
(Continued)

FOREIGN PATENT DOCUMENTS

JP          0814103 A       1/1996
JP          0854156 A       2/1996
(Continued)

OTHER PUBLICATIONS

V Havelský, Energetic efficiency of cogeneration systems for combined heat, cold and power production, International Journal of Refrigeration, vol. 22, Issue 6, Sep. 1999, pp. 479-485.*

(Continued)

*Primary Examiner* — Christopher E Everett
(74) *Attorney, Agent, or Firm* — Cantor Colburn LLP

(57) ABSTRACT

In a cogeneration system 1 configured to supply electricity and heat with a gas engine 5 as an engine and including a thermally driven heat pump 3 and a thermally-driven-heat-pump assisted electric heat pump 4 as an electrically driven heat pump, a controller 44 as an operation controller configured to perform a power control in such a manner that generated electricity e of the gas engine 5 becomes equal to balance electricity eb as the sum of required electricity De2 for driving a thermally-driven-heat-pump assisted electrically driven heat pump 4 configured to compensate heat demand Dh of the cogeneration system 1 and electricity demand De1 of the cogeneration system 1, is provided.

1 Claim, 8 Drawing Sheets

(51) Int. Cl.
*F01K 13/02* (2006.01)
*F02G 5/04* (2006.01)
*F25B 25/02* (2006.01)
*F25B 15/00* (2006.01)
*F25B 27/02* (2006.01)

(56) References Cited

U.S. PATENT DOCUMENTS

| | | | | |
|---|---|---|---|---|
| 4,813,242 | A * | 3/1989 | Wicks | F25B 15/008 62/238.3 |
| 6,536,215 | B1 * | 3/2003 | Vikstrom | F01K 17/02 60/641.1 |
| 7,275,382 | B2 * | 10/2007 | Cho | F25B 13/00 62/238.7 |
| 7,305,840 | B2 * | 12/2007 | Kang | F24F 3/1423 62/238.7 |
| 2003/0051496 | A1 * | 3/2003 | Fukushima | F02C 6/14 62/238.3 |
| 2004/0093876 | A1 * | 5/2004 | Inagaki | B01J 20/02 62/112 |
| 2005/0011209 | A1 * | 1/2005 | Sawada | F25B 27/02 62/228.3 |
| 2006/0123819 | A1 * | 6/2006 | Choe | F25B 25/02 62/238.3 |

FOREIGN PATENT DOCUMENTS

| | | |
|---|---|---|
| JP | 0886533 A | 4/1996 |
| JP | 0926226 A | 1/1997 |
| JP | 10288089 A | 10/1998 |
| JP | 11223412 A | 8/1999 |
| JP | 2001216001 A | 8/2001 |
| JP | 2002256970 A | 9/2002 |
| JP | 2003113739 A | 4/2003 |
| JP | 2003121025 A | 4/2003 |

OTHER PUBLICATIONS

Extended European Search Report corresponding to Application No. 12738995.9-1606/2669499 PCT/JP2012/051181; Date of Mailing: Jan. 14, 2016.

* cited by examiner

Fig.4

(FORMULA 61) $$eb = De1 + \dfrac{Dh2 - (R \times eb - \dfrac{Dh1}{Acop}) \times Acop}{Hcop}$$

(FORMULA 62) $$eb = \dfrac{Hcop \times De1 + Dh1 + Dh2}{Hcop + R \times Acop}$$

$$\left\{\begin{array}{ll} eb & : \text{BALANCE ELECTRICITY} \\ De1 & : \text{ELECTRICITY DEMAND OF ELECTRICITY CONSUMING DEVICE GROUP} \\ Dh1 & : \text{HEAT DEMAND OF LOW GRADE HEAT UTILIZATION DEVICE GROUP} \\ Dh2 & : \text{HEAT DEMAND OF HIGH GRADE HEAT UTILIZATION DEVICE GROUP} \\ Acop & : \text{PUMP EFFICIENCY OF THERMALLY DRIVEN HEAT PUMP} \\ Hcop & : \text{PUMP EFFICIENCY OF ELECTRICALLY DRIVEN HEAT PUMP} \\ R & : \text{THERMOELECTRIC RATIO} \end{array}\right.$$

COGENERATION SYSTEM

CROSS REFERENCE TO RELATED APPLICATIONS

This is the U.S. national stage of application No. PCT/JP2012/51181, filed on 20 Jan. 2012. Priority under 35 U.S.C. §119(a) and 35 U.S.C. §365(b) is claimed from Japanese Application No. 2011-012157, filed 24 Jan. 2011, the disclosure of which is also incorporated herein by reference.

TECHNICAL FIELD

The present invention relates to a cogeneration system that supplies electricity and heat with an engine, and particularly relates to an operation control technique by which electricity demand and heat demand including high-grade heat demand can be accurately satisfied within the cogeneration system only. Here, the high-grade heat demand is the heat demand in heat utilization devices (hereinafter, referred to as "high-grade heat utilization device") such as a freezer, a refrigerator, and an air conditioner that require detailed temperature control for achieving a predetermined temperature, unlike a heat utilization device (hereinafter, referred to as "low-grade heat utilization device") such as a water heater requiring no detailed temperature control.

BACKGROUND ART

A cogeneration system has conventionally been known that uses a gas engine and the like that runs on city gas and the like as an engine to supply electricity and heat. In such a cogeneration system, an electricity focused operation and a heat focused operation are performed. In the electricity focused operation, an operation pattern is determined in accordance with the electricity demand of an electricity consuming device such as lighting equipment. In the heat focused operation, an operation pattern is determined in accordance with the heat demand of the heat utilization device such as a freezer, a refrigerator, an air conditioner, and a water heater.

However, in both of the operations, the cogeneration system outputs heat and electricity at a certain ratio (hereinafter, referred to as "thermoelectric ratio"), regardless of the electricity demand and the heat demand. Therefore, in the electricity focused operation, if an amount of output heat is insufficient, the shortage portion needs to be compensated by additional electricity or a boiler, and if, on the contrary, the amount of the output heat is more than necessary, the surplus portion needs to be discarded. In the heat focused operation, if the amount of generated electricity is insufficient, the shortage portion needs to be bought from an external electrical system, and if, on the contrary, the amount of the generated electricity is more than necessary, the surplus amount is sold to the electrical system at a low cost.

Thus, a first technique has been known for optimizing the operation pattern to prevent the shortage and surplus of the generated electricity and the output heat (see, for example, Patent Document 1). In the first technique, the variations of the electricity demand and the heat demand over time are learned through a plurality of steps to predict patterns of the demands, and the operation pattern is determined on the basis of the prediction. Thus, the wasteful energy consumption is prevented, whereby the energy cost is reduced.

Moreover, techniques haven been known for driving a thermally driven heat pump and an electrically driven heat pump by means of the generated electricity and the output heat from the cogeneration system and the like (see, for example, Patent Document 2, Patent Document 3, and Patent Document 4). In a second technique described in Patent Document 2 and Patent Document 3 of the techniques, cooling of a refrigerant liquid is facilitated by means of cooling from a thermally driven heat pump to reduce the enthalpy of the refrigerant liquid, to thereby improve the freezing capacity. In a third technique described in Patent Document 4, operations of the thermally driven heat pump and the electrically driven heat pump are combined in such a manner that the output heat is appropriately increased/reduced in accordance with the variation of the heat demand over time, to thereby improve heat demand following capability.

[Patent Document 1] Japanese Unexamined Patent Application Publication No. H8-14103.
[Patent Document 2] Japanese Unexamined Patent Application Publication No. H11-223412.
[Patent Document 3] Japanese Unexamined Patent Application Publication No. 2003-121025.
[Patent Document 4] Japanese Unexamined Patent Application Publication No. H8-86533.

DISCLOSURE OF THE INVENTION

Problems to be Solved by the Invention

In convenience stores, hotels, hospitals, and the like, electricity consuming devices such as lighting equipment and heat utilization devices including the high-grade heat utilization devices such as a freezer, a refrigerator, and an air conditioner are operated all day long almost without stopping at all. Thus, to apply the cogeneration system to the devices, the electricity focused operation needs to be preformed to surely satisfy the electricity demand of the electricity consuming device, and also the output heat from the engine needs to be used to satisfy the high-grade heat demand.

However, with the first technique, in the electricity focused operation, the shortage with respect to the heat demand is simply compensated by the surplus portion of the output heat from the engine and hot water heated by gas supplied from the outside. Thus, it is difficult to satisfy the high-grade heat demand described above. To satisfy the high-grade heat demand, electricity bought from an external electricity system needs to be supplied to a heating-cooling device for example, to accurately compensate the shortage with respect to the heat demand. Thus, there is a problem that the electricity demand and the heat demand cannot be satisfied as accurately as possible, whereby the energy cost is high.

Also in both second and third techniques, to satisfy the high-grade heat demand, electricity bought from the external electricity system needs to be supplied to a heating-cooling device for example, to accurately compensate the shortage with respect to the heat demand. Thus, the electricity demand and the heat demand cannot be satisfied as accurately as possible, whereby the energy cost is high, as in the first technique.

Means for Solving the Problems

A first aspect of the present invention is a cogeneration system configured to supply electricity and heat with an engine, and including: a thermally driven heat pump; and an electrically driven heat pump. An operation controller is provided that is configured to perform electricity control in such a manner that generated electricity of the engine becomes equal to a balance electricity as the sum of required electricity for driving an electrically driven heat pump configured to compensate heat demand of the cogeneration system and electricity demand of the cogeneration system, the balance electricity being calculated from the following formula:

$$eb = \frac{Hcop \times De1 + Dh1 + Dh2}{Hcop + R \times Acop}$$

where, eb represents the balance electricity, De1 represents electricity demand of an electricity consuming device group, Dh1 represents heat demand of a low-grade heat utilization device group, Dh2 represents heat demand of a high-grade heat utilization device group, Hcop represents a pump efficiency of the electrically driven heat pump, Acop represents a pump efficiency of the thermally driven heat pump, and R represents thermoelectric ratio.

Effects of the Invention

With the configuration described above, the present invention can provide the following effect.

Specifically, by setting the balance electricity specifically calculated from the predetermined formula as a target, and performing the electricity control of increasing/reducing the generated electricity of the engine to achieve the balance electricity, the electricity demand of the cogeneration system, and the required electricity for driving the electrically driven heat pump are satisfied, and also the high-grade heat demand of the cogeneration system can be satisfied by adjusting the heat outputted as the electrically driven heat pump drives. Thus, the electricity demand and the heat demand can be satisfied as accurately as possible within the cogeneration system only, and the energy cost can be made low.

BRIEF DESCRIPTION OF THE DRAWINGS

FIG. 4 is an explanatory diagram showing formulas of a balance electricity of the same.

DESCRIPTION OF REFERENCE NUMERAL

Figure 1:
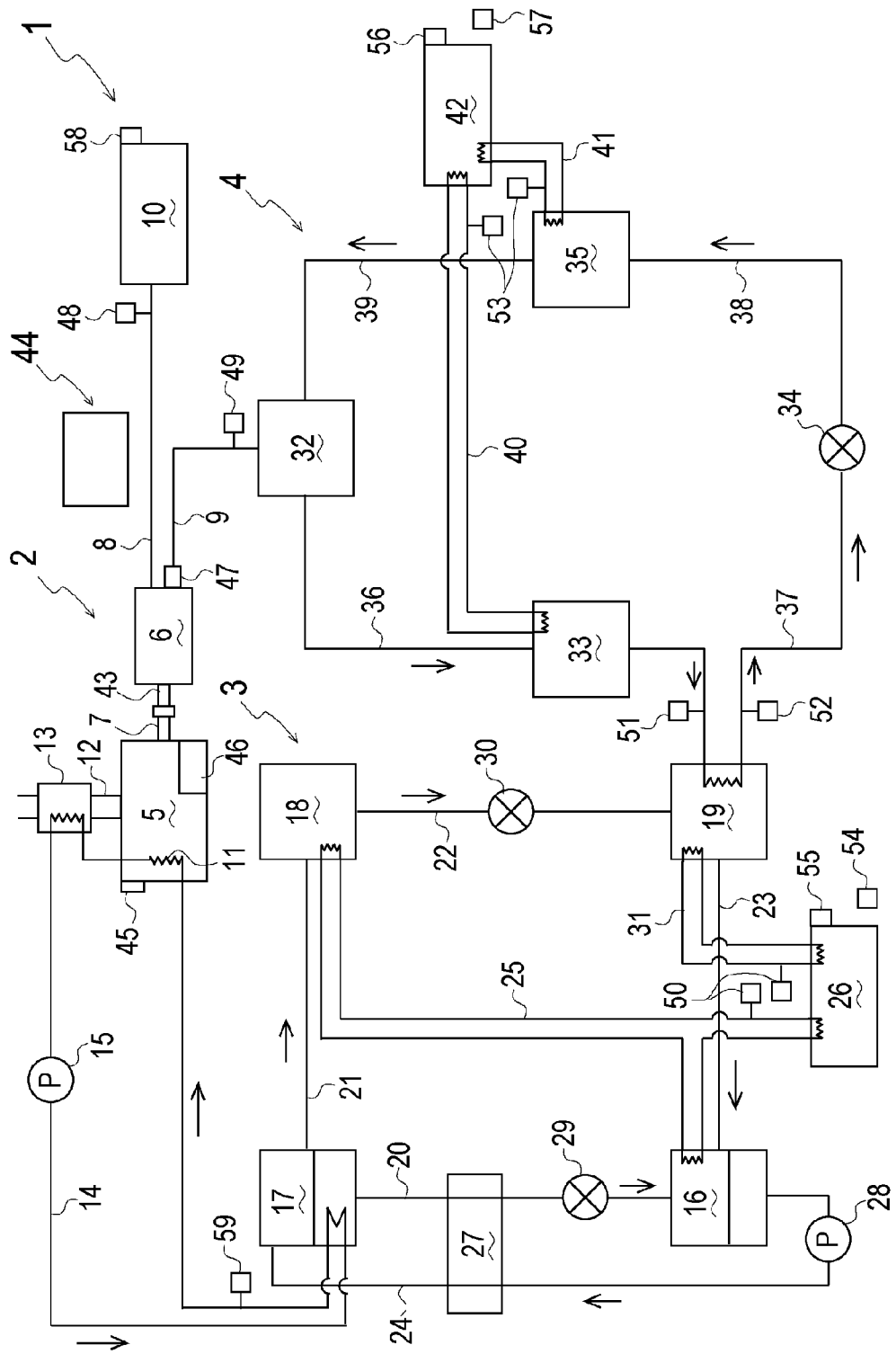
FIG. 1 is a system block diagram showing an overall configuration of a cogeneration system 1 according to the present invention.

1 Cogeneration system
3 Thermally driven heat pump
4 Thermally-driven-heat-pump assisted electrically driven heat pump
4A Electrically driven heat pump
5 Gas engine (engine)
44 Controller (operation controller)
De1 Electricity demand
De2, De3 Required electricity
Dh Heat demand
e Generated electricity
eb Balance electricity (sum of electricity demand and required electricity)
h Output heat from gas engine (output heat from engine)
h3, h5 Heat from electrically driven heat pump
h4 Heat from thermally driven heat pump

BEST MODE FOR CARRYING OUT THE INVENTION

Now, embodiments of the invention will be described.
First, an overall configuration of the cogeneration system according to the present invention is described with reference to FIG. 1 and FIG. 2.
The cogeneration system 1 includes a cogeneration device 2 that supplies electricity and heat, a thermally driven heat pump 3 driven through thermal regeneration of an absorbent solution that has absorbed a refrigerant, a thermally-driven-heat-pump assisted electrically driven heat pump 4 of a compression type driven through compression of the refrigerant, and a controller 44 that controls the elements.
Of the elements, the cogeneration device 2 includes a gas engine 5 that is a reciprocating internal combustion engine and a generator 6 having an input shaft 43 coupled to an output shaft 7 of the gas engine 5 in such a manner as to be capable of moving in conjunction with each other. The generator 6 is coupled to an electricity consuming device group 10 including lighting equipment and the like, and to the thermally-driven-heat-pump assisted electrically driven heat pump 4 through a power converter 47 such as an inverter and an electrical circuit 9. Thus, the electricity generated by the generator 6 is supplied to the energy consuming device group 10 and the thermally-driven-heat-pump assisted electrically driven heat pump 4.
The gas engine 5 is provided, in its housing and the like, with a cooling water path 11 for cooling water and an exhaust gas path 12. The exhaust gas exhaust path 12 is provided with, at an intermediate portion, an exhaust gas heat exchanger 13 with which the cooling water path 11 communicates. The exhaust gas exchanger 13 and the cooling water path 11 are coupled to the thermally driven heat pump 3 through a flow path 14 provided with a cooling water pump 15 at an intermediate portion.
In such a configuration, the cooling water heated by the heat of the gas engine 5 while flowing through the cooling water path 11 is further heated at the exhaust gas heat exchanger 13 by the hot exhaust gas sent from the gas engine 5 through the exhaust gas path 12, and then is pumped to the thermally driven heat pump 3 by the cooling water pump 15. Thus, the output heat from the gas engine 5 is supplied to the thermally driven heat pump 3 via the cooling water.
The thermally driven heat pump 3, for example, uses water as the refrigerant and lithium bromide-water solution as an absorbent, and includes an absorber 16, a regenerator 17, a condenser 18, an evaporator 19, flow paths 20, 21, 22, and 23 that circulate through the units, and the like.
Of the units, the absorber 16 is coupled to the evaporator 19 through the flow path 23. Refrigerant vapor generated by evaporation in the evaporator 19 is absorbed by the absorbent in the absorber 16 through the flow path 23 and thus an absorbent solution is formed. Furthermore, the absorber 16 is coupled to the regenerator 17 through the flow path 24 provided with a solution pump 28 at an intermediate portion, so that the absorbent solution is pumped to the regenerator 17 through the flow path 24 and reserved therein.

The flow path 14 is coupled to the regenerator 17. The reserved absorbent solution is heated by the heat of the cooling water flowing through the flow path 14. Thus, the refrigerant in the absorbent solution is separated as the refrigerant vapor, whereby the absorbent solution is condensed. Furthermore, the regenerator 17 is coupled to the absorber 16 through the flow path 20 provided with a decompression mechanism 29 at an intermediate portion, and thus the thermally condensed low pressure absorbent solution is supplied to the absorber 16 through the flow path 20. A solution heat exchanger 27 is disposed between the flow path 20 and the flow path 24. Through the solution heat exchanger 27, the absorbent solution pumped from the absorber 16 to the regenerator 17 is heated partly through the way so that the thermal separation of the refrigerant in the regenerator 17 is facilitated.

The condenser 18 is coupled to the regenerator 17 through the flow path 21. Thus, the refrigerant vapor from the regenerator 17 is introduced into the condenser 18 through the flow path 21 to be condensed into the refrigerant. Furthermore, the condenser 18 is coupled to the evaporator 19 through the flow path 22 provided with a decompression mechanism 30 at an intermediate portion. Thus, the condensed low pressure refrigerant is supplied to the evaporator 19 through the flow path 22.

The evaporator 19 is coupled to a low-grade heat device group 26 including a water heater and the like through a flow path 31. The heating medium flowing through the flow path 31 is deprived of heat and thus is cooled as the low pressure refrigerant from the condenser 18 evaporates. Here, the absorber 16 is decompressed as the refrigerant vapor is absorbed by the absorbent and thus the pressure therein is extremely low. The evaporator 19 communicated with the absorber 16 through the flow path 23 is also maintained at a low pressure. Thus, the refrigerant from the condenser 18 is readily vaporized only by the heat of the heating medium flowing through the flow path 31, to flow through the flow path 23 as the refrigerant vapor to be supplied to the absorber 16.

An absorption heat cycle of the thermally driven heat pump 3 is thus configured. As the refrigerant in the absorption heat cycle transforms, heat is generated by the absorbed heat and the condensed heat respectively in the absorber 16 and the condenser 18, and cooling is generated by the evaporation heat in the evaporator 19. Here, the absorber 16 and the condenser 18 are also coupled to the low-grade heat utilization device group 26 through the flow path 25, and thus the cooling and the heat can be supplied to the low-grade heat device group 26 respectively through the flow path 31 and the flow path 25.

The thermally-driven-heat-pump assisted electrically driven heat pump 4, for example, uses hydrofluorocarbon as the refrigerant, and includes a compressor 32, a condenser 33, a decompression mechanism 34 such as an expansion valve, an evaporator 35, flow paths 36, 37, 38, and 39 circulating through the units, and the like.

Of the units, the compressor 32 is coupled to the evaporator 35 through the flow path 39. The cold-low pressure refrigerant vapor produced by the evaporation in the evaporator 35 flows to the compressor 32 through the flow path 39 to be compressed into hot-high pressure refrigerant vapor. The compressor 32 is coupled to the electrical circuit 9 and thus can be electrically driven by a part of the electricity generated by the generator 6.

The condenser 33 is coupled to the compressor 32 through the flow path 36. The hot-high pressure refrigerant vapor from the compressor 32 is introduced into the condenser 33 through the flow path 36 to be condensed into a refrigerant.

The decompression mechanism 34 is coupled to the condenser 33 through the flow path 37 provided with the evaporator 19 of the thermally driven heat pump 3 at an intermediate portion. The refrigerant from the condenser 33 is decompressed by the decompression mechanism 34 after being supercooled beforehand by the heat exchange in the evaporator 19. The decompression mechanism 34 is coupled to the evaporator 35 through the flow path 38, and the supercooled low pressure refrigerant is supplied to the evaporator 35 through the flow path 38.

The evaporator 35 is coupled to a high-grade heat utilization device group 42 such as a freezer, a refrigerator, and an air conditioner through a flow path 41. The low pressure refrigerant from the decompression mechanism 34 is heated and thus evaporated by the heating medium flowing through the flow path 41, into a cold-low pressure refrigerant vapor to flow through the flow path 39 to be supplied into the compressor 32.

The compression heat cycle of the thermally-driven-heat-pump assisted electrically driven heat pump 4 is thus configured. As the refrigerant in the compression heat cycle transforms, heat is generated by the condensed heat in the condenser 33, and cooling is generated by the evaporation heat in the evaporator 35. Here, the condenser 33 is also coupled to the high-grade heat utilization device group 42 through a flow path 40, and thus the cooling and the heat can be supplied to the high-grade heat utilization device group 42 respectively through the flow path 41 and the flow path 40.

Furthermore, as described above, in the thermally-driven-heat-pump assisted electrically driven heat pump 4, the refrigerant flowing between the condenser 33 and the decompression mechanism 34 is supercooled by the cooling generated in the evaporator 19 of the thermally driven heat pump 3 to have a lower enthalpy. Thus, the cycle efficiency of the compression heat cycle is improved, and thus the pump efficiency of the electrical driven heat pump is largely improved.

The controller 44 is coupled to an electricity sensor 48 disposed at an input portion of the electricity consuming device group 10, an electricity sensor 49 disposed at an input portion of the compressor 32 of the thermally-driven-heat-pump assisted electrically driven heat pump 4, a water temperature sensor 59 that detects the temperature of the cooling water in the flow path 14 leading to the thermally driven heat pump 3, a medium temperature sensor group 50 that detects the temperature of the heating medium introduced to the low-grade heat utilization device group 26, an ambient temperature sensor 54 that detects the ambient temperature around the low-grade heat utilization device group 26, medium temperature sensors 51 and 52 that respectively detect the temperatures of the refrigerant before and after the supercooling in the flow path 37 of the thermally-driven-heat-pump assisted electrically driven heat pump 4, a medium temperature sensor group 53 that detects the heating medium introduced into the high-grade heat utilization device group 42, and an ambient temperature sensor 57 that detects the ambient temperature around the high-grade heat utilization device group 42. Detection signals from the sensors are inputted to the controller 44.

Furthermore, the controller 44 is coupled to an engine switch 45 that drives or stops the gas engine 5, an engine output controller 46 that controls a rotation speed of the output shaft 7 of the gas engine 5, the power converter 47 such as an inverter that controls the electricity outputted to the compressor 32 of the thermally-driven-heat-pump assisted electrically driven heat pump 4 from the generator 6, an electricity setter 58 that sets the electricity consumed by the electricity consuming device group 10, a temperature setter 55 that sets an output temperature (hereinafter referred to "temperature of heat demand") from the low-grade heat utilization device group 26, a temperature setter 56 that sets the temperature of heat demand of the high-grade heat utilization device group 42, the cooling water pump 15 between the gas engine 5 and the thermally driven heat pump 3, the solution pump 28 of the thermally driven heat pump 3, and the compressor 32 of the thermally-driven-heat-pump assisted electrically driven heat pump 4. On the basis of the detection values obtained from the detection signals, the controller 44 outputs driving signals.

Next, the energy flow in the cogeneration system 1 having the configuration described above will be described with reference to FIG. 1, FIG. 3 and FIG. 4.

Figure 2:
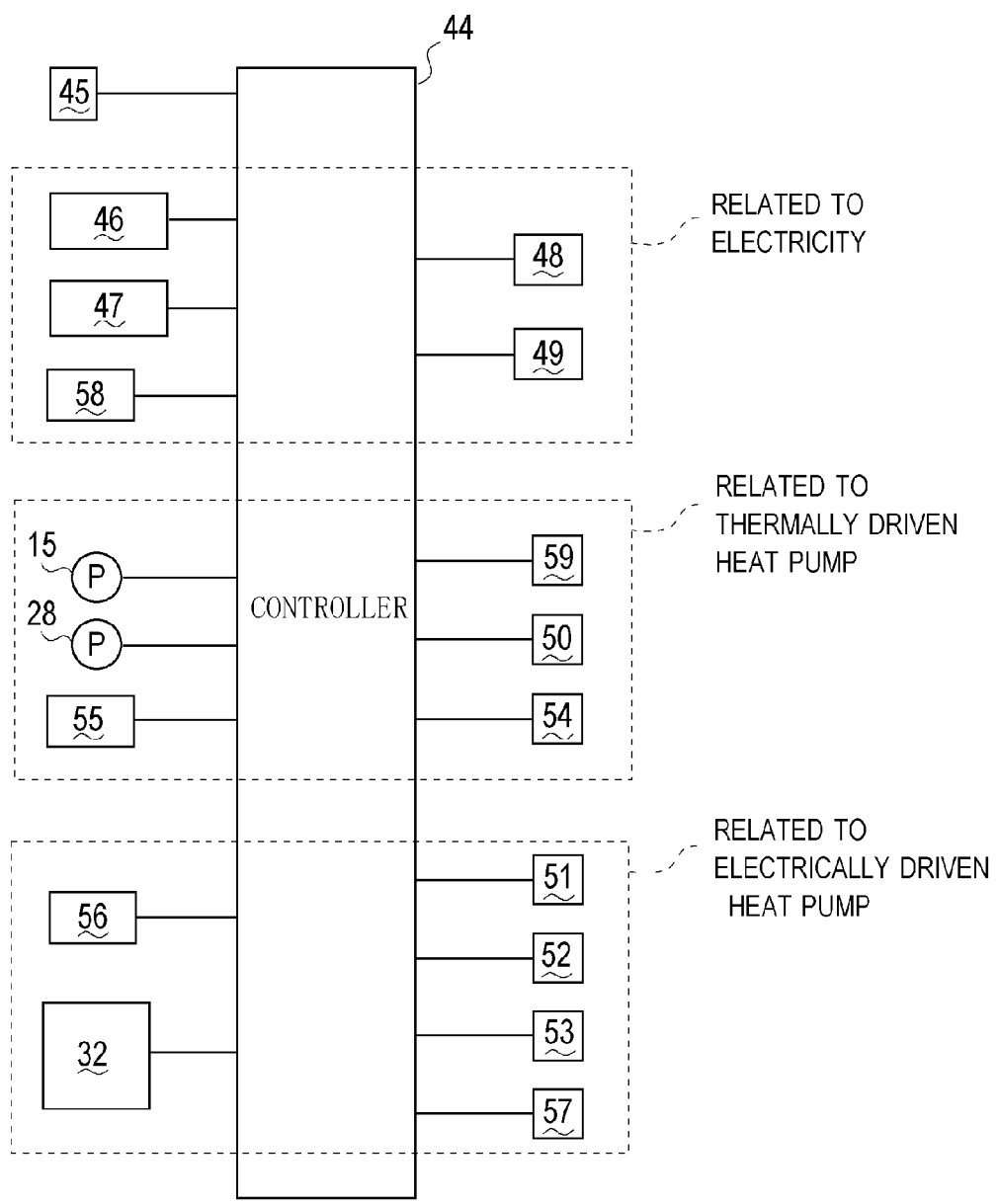
FIG. 2 is a control block diagram of the same.
Figure 3:
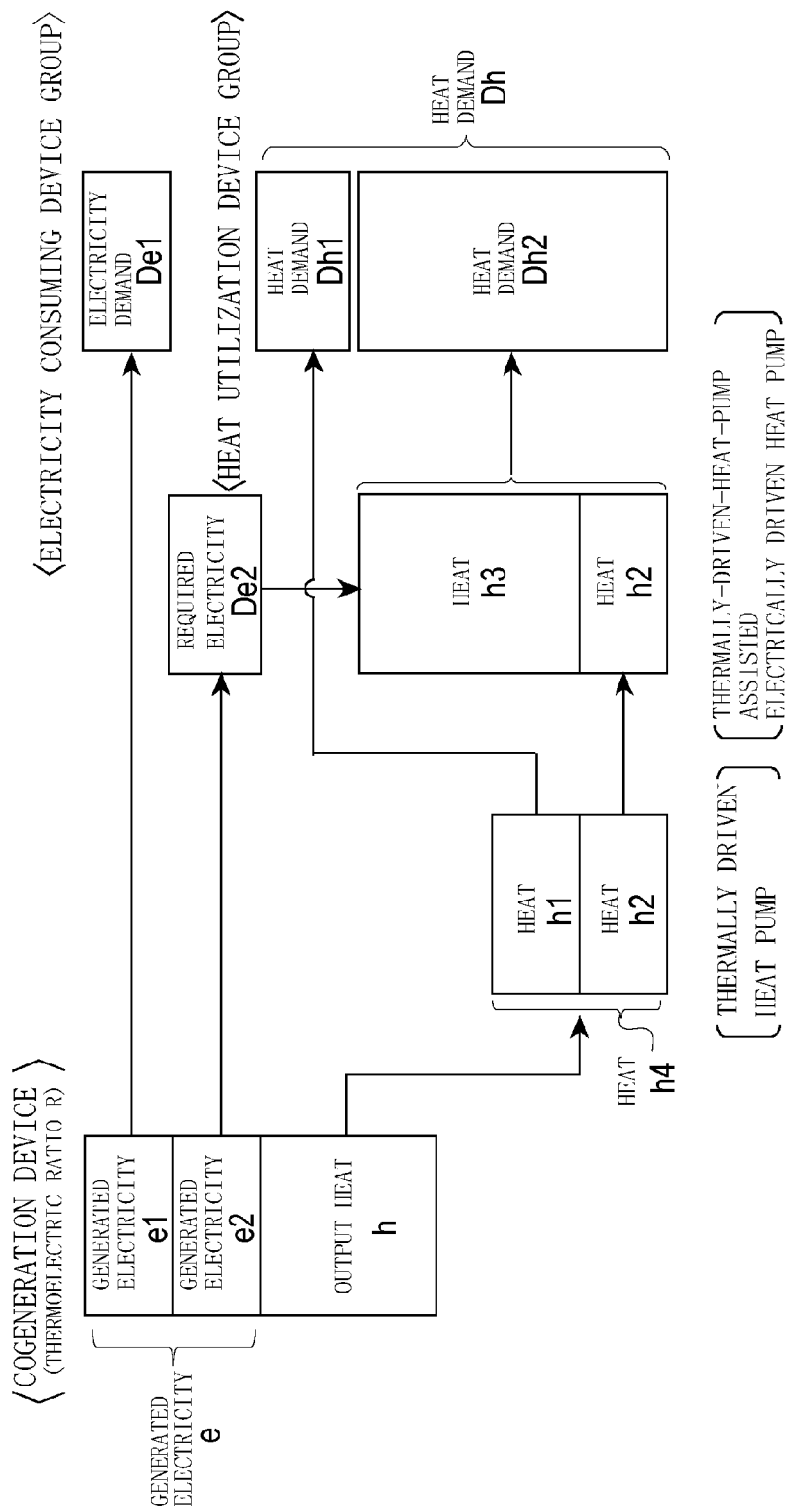
FIG. 3 is an energy flowchart of the same.

As shown in FIG. 1 and FIG. 3, heat and electricity are outputted from the cogeneration device 2 at a thermoelectric ratio R (=output heat h/generated electricity e).

Of the values, the output heat h is supplied to the regenerator 17 of the thermally driven heat pump 3 in a form of heat as described above. Thus, the absorbent solution reserved in the regenerator 17 is heated, whereby the absorption heat cycle is started. Accordingly, the output heat h is converted into the heat in the absorber 16 and the condenser 18 of the thermally driven heat pump 3, and then is converted into the cooling in the evaporator 19.

A part of these heat and cooling is supplied to the heat demand Dh1 of the low-grade heat utilization device group 26 as heat h1, and the rest is supplied as heat h2 for the supercooling of the refrigerant in the thermally-driven-heat-pump assisted electrically driven heat pump 4.

Here, a part of the generated electricity e is supplied as generated electricity e1 to the electricity demand De1 of the electricity consuming device group 10, and the rest is supplied as generated electricity e2 to the electricity demand De2 of the compressor 32 of the thermally-driven-heat-pump assisted electrically driven heat pump 4. Thus, the compressor 32 is driven so that the cold-low pressure refrigerant vapor is compressed, whereby the compression heat cycle is started.

Thus, as described above, the heat is produced in the condenser 33, and the cooling is produced in the evaporator 35. The heat and the cooling are supplied as the sum of the heat h2 and the heat h3 to the heat demand Dh2 of the high-grade heat utilization device group 42. Here, the heat h3 represents the heat and cooling produced in the thermally-driven-heat-pump assisted electrically driven heat pump 4 in a case without the supercooling in the thermally driven heat pump 3.

In FIG. 4, a balance between heat and electricity in the energy flow is described in Formula 61, and a value obtained by solving Formula 61 for the generated electricity eb in the balanced state (hereinafter referred to as "balance electricity") is described in Formula 62.

As described above, De1 denotes the electricity demand of the electricity consuming device group 10, Dh1 the heat demand of the low-grade heat utilization device group 26, Dh2 the heat demand of the high-grade heat utilization device group 42, and R the thermoelectric ratio. Moreover, Acop denotes the pump efficiency of the thermally driven heat pump 3 and Hcop the pump efficiency of the electrically driven heat pump 4.

Thus, by performing the electricity control in such manner that the generated electricity e of the gas engine 5 becomes equal to the balance electricity eb shown in Formula 62 including the heat demand De1, the heat demands Dh1 and Dh2, the thermoelectric ratio R, and the pump efficiencies Acop and Hcop, an operation (hereinafter referred to as "highly efficient operation") can be performed in which the amount of electricity and heat supplied from the cogeneration device 2 and the heat electricity demand of the electricity consuming device group 10 and the heat utilization device groups 26 and 42 are accurately balanced.

Figure 5:
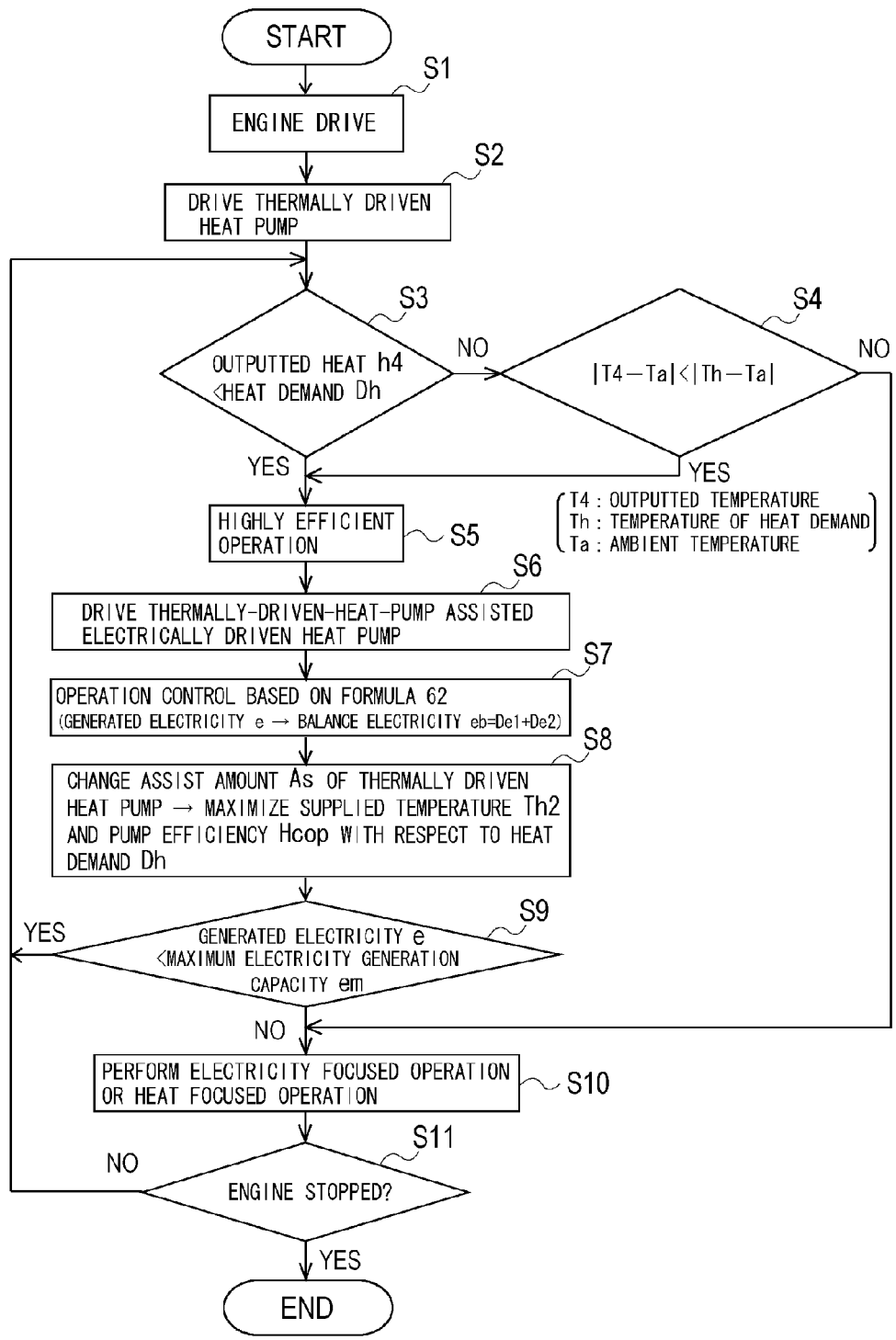
FIG. 5 is a flowchart showing an operation procedure of the same.

Next, an operation control procedure of the cogeneration system 1 involving the energy flow as described above will be described with reference to FIG. 1 to FIG. 5, mainly FIG. 5.

First, when the engine switch 45 is turned "ON" to drive the gas engine 5 (Step S1), an engine driving signal is inputted into the controller 44, and a pump driving signal is transmitted from the controller 44 to the cooling water pump 15 and the solution pump 28, whereby the thermally driven heat pump 3 is driven (Step S2).

When the absorption heat cycle is thus started, the detected temperature signal from the medium temperature sensor group 50 and the set temperature signals from the temperature setter 55 and 56 are inputted to the controller 44. In the controller 44, the heat h4 (=h1+h2) outputted from the thermally driven heat pump 3 and the heat demand Dh (=Dh1+Dh2) of the heat utilization device groups 26 and 42 are calculated. When the heat demand Dh exceeds the heat h4 (Step S3, YES), the highly efficient operation according to the present invention starts (Step S5).

On the contrary, if the heat demand Dh does not exceed the heat h4 (Step S3, NO), the detected temperature signals from the ambient temperature sensors 54 and 57 are further inputted to the controller 44. In the controller 44, the temperature T4 of the heat h4 outputted from the thermally driven heat pump 3, the ambient temperature Ta around the heat utilization device groups 26 and 42, and the temperature Th of the heat demand Dh of the heat utilization device groups 26 and 42 are calculated. The highly efficient operation also starts if |T4−Ta|<|Th−Ta| holds true, and the temperature Th of the heat demand Dh exceeds the temperature T4 of the heat h4 (Step S4, YES), (Step S5).

If the heat demand Dh does not exceed the heat h4 and the temperature Th of the heat demand Dh does not exceed the temperature T4 of the heat h4 (Step S4, NO), the normal electricity focused operation or heat focused operation is performed (Step S10).

When the highly efficient operation starts, the driving signals are transmitted from the controller 44 to the engine output controller 46 and the power converter 47. Then, the electricity is transmitted from the generator 6 to the compressor 32, whereby the thermally-driven-heat-pump assisted electrically driven heat pump 4 is driven (Step S6).

When the compression heat cycle thus starts, the controller 44 receives the detected electricity signals from the electricity sensors 48 and 49, the set electricity signal from the electricity setter 58, and the detected temperature signals from the water temperature sensor 59 and the medium temperature sensor groups 50 and 53. In the controller 44, the actually generated electricity e (=e1+e2) outputted from the generator 6, the electricity demand De1, and the pump efficiencies Acop and Hcop are calculated.

By substituting the heat demands Dh1 and Dh2 that have been calculated and the thermoelectric ratio R that is a set value as well as the electricity demand De1 and the pump efficiencies Acop and Hcop into Formula 62, the balance electricity eb is calculated. The engine output controller 46 and the power converter 47 are controlled in such a manner that the generated electricity e is set to the balance electricity eb (=De1+De2) (Step S7). Thus, the heat demand Dh2 of the high-grade heat utilization device group 42 requiring a detailed temperature control can be satisfied.

Then, the controller 44 receives the detected temperature signals from the medium temperature sensors 51, 52, and 53. In the controller 44, the supplied temperature Th2 to the high-grade heat utilization device group 42 and an assist amount As of thermally driven heat pump 3 to the thermally-driven-heat-pump assisted electrically driven heat pump 4 are calculated. Through modifying the assist amount As, the supplied temperature Th2 and the pump efficiency Hcop that have been calculated are maximized with respect to the heat demand Dh (Step S8). The assist amount As is obtained from the difference between the temperatures detected by the medium temperature sensors 51 and 52.

When the generated electricity e is below the maximum electricity generation capacity em of the cogeneration device 2 (Step S9, YES), the process returns to Step S3. On the contrary, if the generated electricity e is equal to or higher than the maximum electricity generation capacity em of the cogeneration device 2 (Step S9, NO), the conventional electricity focused operation or the heat focused operation is performed (Step S10). The process repeatedly returns to Step S3 so that the operation control is repeated until the gas engine 5 stops (Step S11, YES).

Specifically, as described above, in the cogeneration system 1 configured to supply electricity and heat with the gas engine 5 as an engine and including the thermally driven heat pump 3 and the thermally-driven-heat-pump assisted electric heat pump 4 as an electrically driven heat pump, the controller 44 as an operation controller configured to perform an electricity control in such a manner that the generated electricity e of the gas engine 5 becomes equal to the balance electricity eb as the sum of the required electricity De2 for driving the thermally-driven-heat-pump assisted electrically driven heat pump 4 configured to compensate the heat demand Dh of the cogeneration system 1 and the electricity demand De1 of the cogeneration system 1, is provided. Thus, the predetermined electricity demand De1 of the cogeneration system 1, and the required electricity De2 for driving the thermally-driven-heat-pump assisted electrically driven heat pump 4 are satisfied by increasing/reducing the generated electricity e of the gas engine 5. The heat demand Dh2 as high-grade heat demand of the cogeneration system 1 can be satisfied by adjusting the heat h2 and h3 outputted as the thermally-driven-heat-pump assisted electrically driven heat pump 4 is driven. Thus, the electricity demand De1 and the heat demand Dh can be satisfied as accurately as possible within the cogeneration system 1 only, and the energy cost can be made low.

Furthermore, in the controller 44 as the operation controller, a thermally-driven-heat-pump focused serial operation is performed in which the output heat h from the gas engine 5 is entirely inputted to the thermally driven heat pump 3, and a difference between the heat h4 from the thermally driven heat pump 3 and the heat demand Dh of the cogeneration system 1 is compensated by the heat h3 from the thermally-driven-heat-pump assisted electrically driven heat pump 4. Thus, a large amount of the output heat h outputted from the gas engine 5 is efficiently utilized so that a less amount of heat h3 needs to be compensated by the thermally-driven-heat-pump assisted electrically driven heat pump 4. Thus, the electricity required for the driving can be minimized, thereby allowing the gas engine 5 with a low power generation capacity to satisfy a large amount of electricity demand De1. Accordingly, an attempt to reduce the device cost of the cogeneration system 1 is facilitated.

Furthermore, the electrically driven heat pump includes the thermally-driven-heat-pump assisted electrically driven heat pump 4 in which a refrigerant exchanges heat with the heat from the thermally driven heat pump 3. Thus, the pump efficiency Hcop of the thermally-driven-heat-pump assisted electrically driven heat pump 4 can be largely improved by using only a part of the heat from the thermally driven heat pump 3. Thus, compared with a case where the heat is independently taken out from the thermally driven heat pump 3 and the thermally-driven-heat-pump assisted electrically driven heat pump 4A to satisfy the heat demand Dh, the heat efficiency and the heating/cooling capacity of the cogeneration system 1 as a whole can be improved.

In the thermally-driven-heat-pump assisted electrically driven heat pump 4 of this embodiment, the refrigerant liquid obtained by condensing the refrigerant vapor in the condenser 33 is supercooled to have a lower enthalpy while flowing through the vaporizer 19 of the thermally driven heat pump 3. Alternatively, the condenser 33 can be omitted so that the refrigerant vapor flows in the vaporizer 19 of the thermally driven heat pump 3 as it is. The configuration is not particularly limited as long as the heat from the thermally driven heat pump 3 cools the refrigerant. Here, the refrigerant vapor is repeatedly condensed and supercooled, whereby the heat loss of the flowing refrigerant can be largely reduced, and thus the pump efficiency Hcop of the thermally-driven-heat-pump assisted electrically driven heat pump 4 can be further improved.

Next, a cogeneration system 1A according to another embodiment will be described with reference to FIG. 6 to FIG. 8. Elements and configuration similar to those in the cogeneration 1 are denoted with the same reference numerals and the detail description thereof is omitted.

Figure 6:
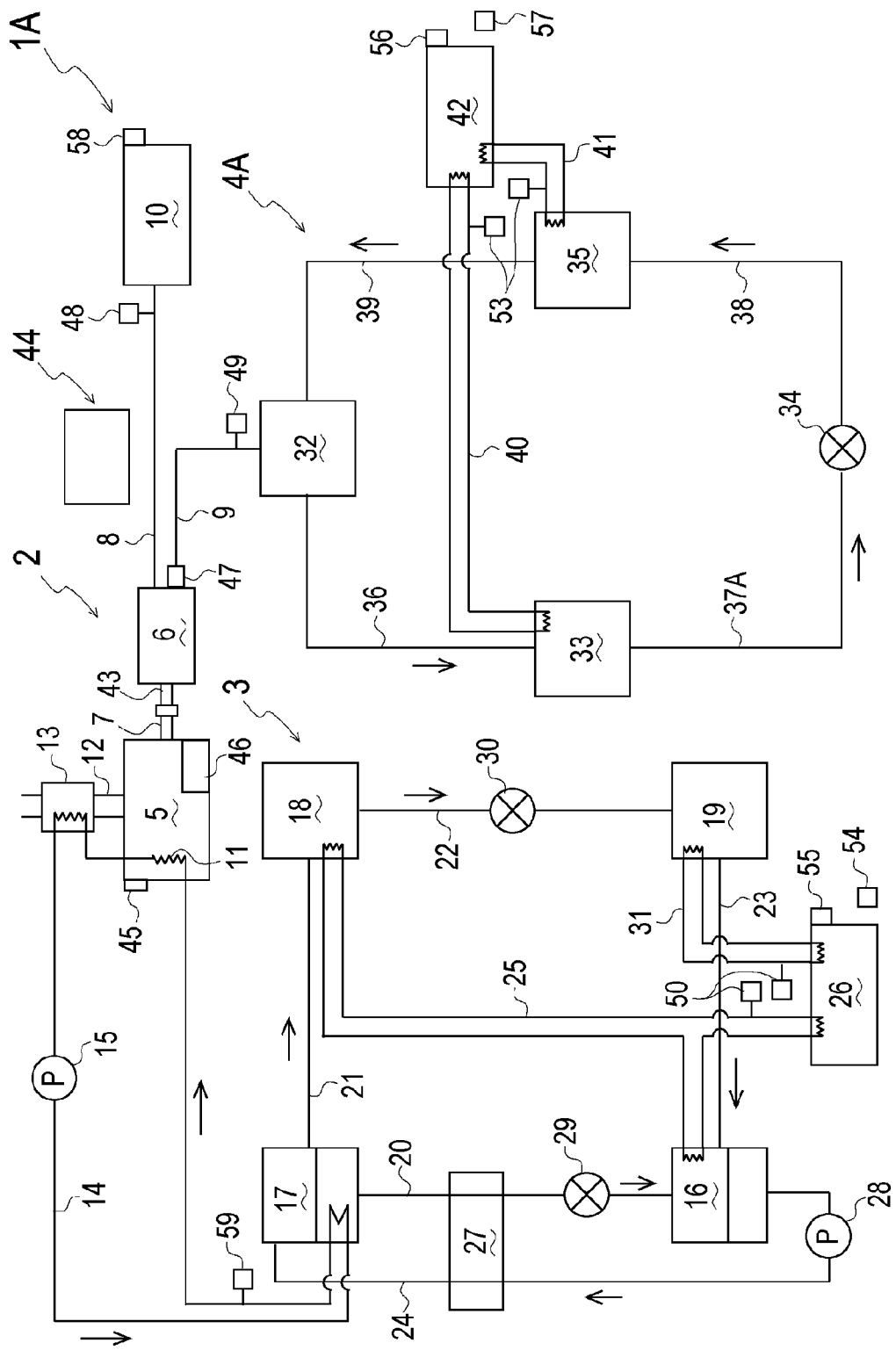
FIG. 6 is a system block diagram showing an overall configuration of a cogeneration system 1A according to another embodiment.

As shown in FIG. 6, the cogeneration system 1A is formed by replacing the thermally-driven-heat-pump assisted electrically driven heat pump 4 in the cogeneration system 1 by an electrically driven heat pump 4A that can independently be driven without the assist from the thermally driven heat pump 3.

Other configuration is the same as that of the cogeneration system 1, and the cogeneration system 1A includes the electrically driven heat pump 4A having the different configuration, as well as the cogeneration device 2, the thermally driven heat pump 3, and the controller 44 that controls these elements.

The electrically driven heat pump 4A, like the thermally-driven-heat-pump assisted electrically driven heat pump 4, includes the compressor 32, the condenser 33, the decompression mechanism 34 such as an expansion valve, the evaporator 35, flow paths 36, 37A, 38, and 39 circulating through the units, and the like. Of the elements, the flow path 37A is not provided with the vaporizer 19 of the thermally driven heat pump 3, unlike the flow path 37. Thus, the condenser 33 and the decompression mechanism 34 are directly coupled, and the refrigerant fluid is sent to from the condenser 33 to the decompression mechanism 34 as it is. Thus, the refrigerant is not supercooled part way through to have a lower enthalpy.

Figure 7:
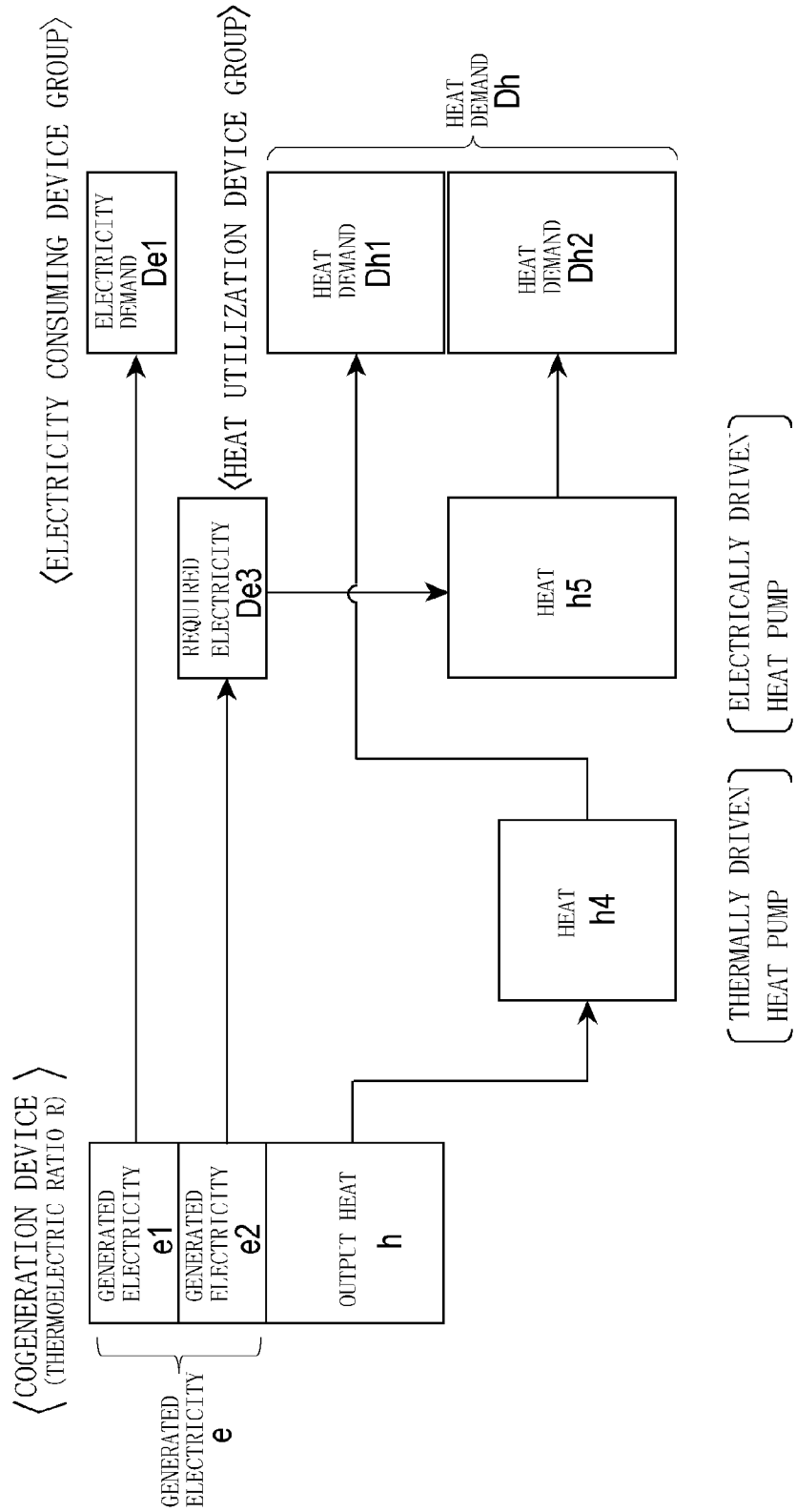
FIG. 7 is an energy flowchart of the same.

As shown in FIG. 7, in the cogeneration system 1A having the above described configuration, unlike in the cogeneration system 1, the output heat h from the gas engine 5 is converted into the heat h4 in the thermally driven heat pump 3, and then is entirely supplied to the heat demand Dh1 of the low-grade heat utilization device group 26.

Meanwhile, as in the cogeneration system 1, a part of the generated electricity e is supplied as the generated electricity e1 to the electricity demand De1 of the electricity consuming device group 10, and the rest of the generated electricity e is supplied as the generated power e2 to the required electricity De3 of the compressor 32 of the electrically driven heat pump 4A. Thus, the compressor 32 is driven and the cold-low pressure refrigerant vapor is compressed, whereby the compression heat cycle starts.

Then, the required electricity De3 is converted into the heat h5 in the electrically driven heat pump 4A, and then is supplied to the heat demand Dh2 of the high-grade heat utilization device group 42.

Figure 8:
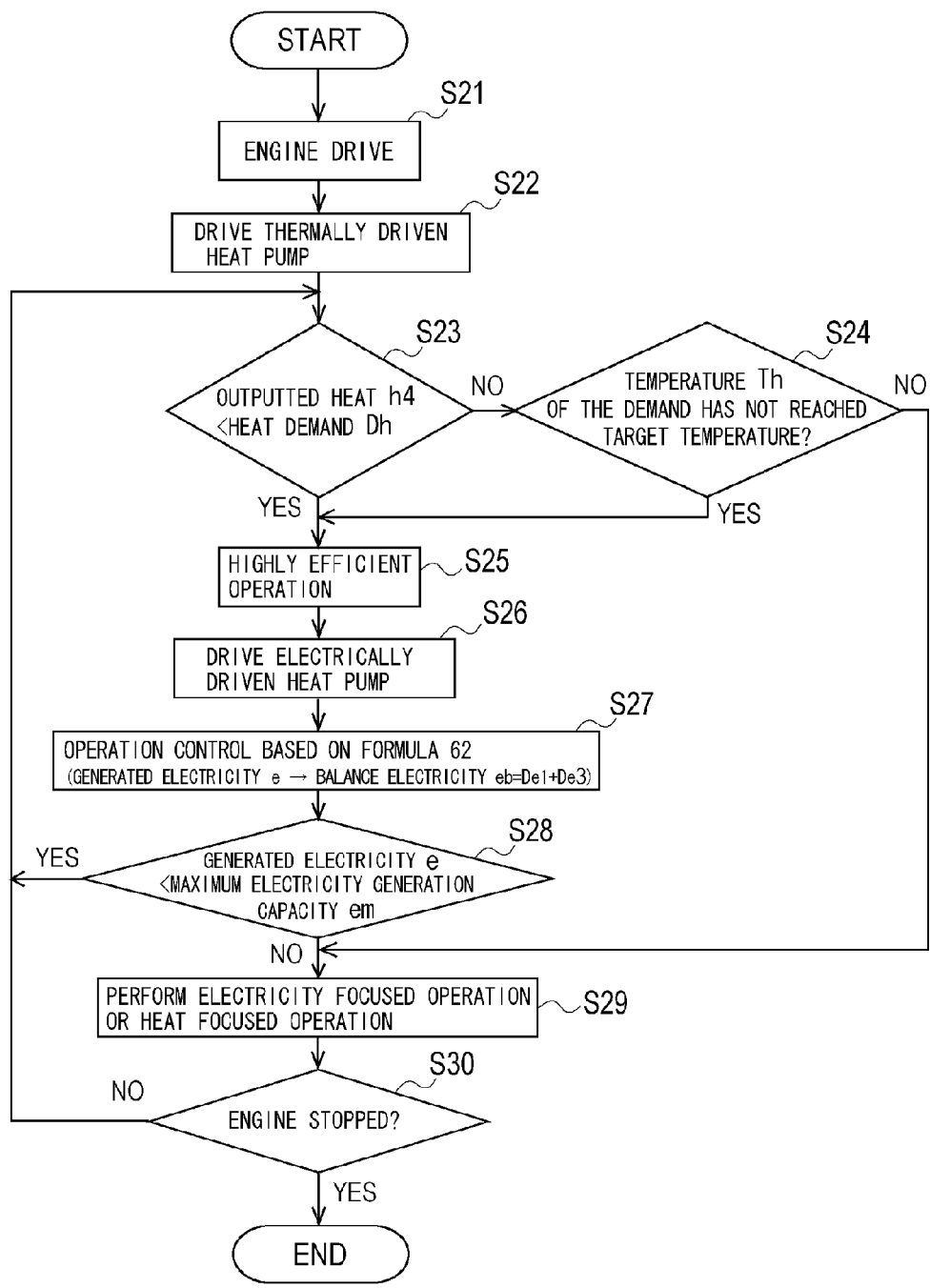
FIG. 8 is a flowchart showing an operation procedure of the same.

As shown in FIG. 8, in the cogeneration system 1A involving such an energy flow, first, when the engine switch 45 is turned "ON" so that the gas engine 5 is driven (Step S21), the thermally driven heat pump 3 is driven (Step S22).

When the absorption heat cycle is thus started, the heat h4 outputted from the thermally driven heat pump 3 and the heat demand Dh of the heat utilization device groups 26 and 42 are compared. When the heat demand Dh exceeds the heat h4 (Step S23 YES), the highly efficient operation starts (Step S25).

The highly efficient operation also starts (Step S25), when the heat demand Dh does not exceed the heat h4 (Step S23, NO), and the temperature Th of the heat demand Dh of the heat utilization devices 26 and 42 has not reached the target temperature (Step S24, YES). If the heat demand Dh does not exceed the heat h4 and the temperature Th of the heat demand Dh has reached the target temperature (Step S24, NO), the normal electricity focused operation or the heat focused operation is performed (Step S29).

When the highly efficient operation starts, the electricity is sent from the generator 6 to the compressor 32, and the electrically driven heat pump 4A is driven (Step S26).

When the compression heat cycle is thus started, in the controller 44, an operation control is performed in such a manner that the actual generated electricity e outputted from the generator 6 is set to the balance electricity eb (=De1+De3) calculated by Formula 62 (Step S27).

When the generated electricity e is below the maximum electricity generation capacity em of the cogeneration device 2 (Step S28, YES), the process returns to Step S23. On the contrary, when the generated electricity e is equal to or higher than the maximum electricity generation capacity em of the cogeneration device 2 (Step S28, NO), the conventional electricity focused operation or heat focused operation is performed (Step S29). The process repeatedly returns to Step S23 so that the operation control is repeated until the gas engine 5 stops (Step S30, YES).

Specifically, as described above, the electrically driven heat pump 4A and the thermally driven heat pump 3 are coupled to each other in parallel, and the heat pumps 3 and 4A can be independently driven. Thus, when the heat demand Dh2 is not so large, and thus the electrically driven heat pump 4A requires no high pump efficiency, the electricity demand De1 and the heat demand Dh can be satisfied, as accurately as possible, within the cogeneration system 1A only, whereby the energy cost can be made small. Furthermore, a communication path between the heat pumps 3 and 4A required for supercooling the refrigerant is not required. Thus, a disposed space and parts for the communication path can be omitted, whereby the cogeneration system can be downsized and at the same time, the component cost can be reduced.

INDUSTRIAL APPLICABILITY

The present invention can be applied to any cogeneration system that supplies electricity and heat with an engine.

The invention claimed is:

1. A cogeneration system configured to supply electricity and heat with an engine, comprising:
a thermally driven heat pump; and
an electrically driven heat pump,
wherein an operation controller configured to perform electricity control in such a manner that generated electricity of the engine becomes equal to a balance electricity as a sum of required electricity for driving the electrically driven heat pump configured to compensate heat demand of the cogeneration system and electricity demand of the cogeneration system, is provided, the balance electricity being calculated from a formula:

$$eb = \frac{Hcop \times De1 + Dh1 + Dh2}{Hcop + R \times Acop}$$

where, eb represents the balance electricity, De1 represents electricity demand of an electricity consuming device group, Dh1 represents heat demand of a low-grade heat utilization device group, Dh2 represents heat demand of a high-grade heat utilization device group, Hcop represents a pump efficiency of the electrically driven heat pump, Acop represents a pump efficiency of the thermally driven heat pump, and R represents thermoelectric ratio.

* * * * *